United States Patent
Goncalves Ferreira et al.

(10) Patent No.: US 8,938,994 B2
(45) Date of Patent: Jan. 27, 2015

(54) METHOD FOR RE-ESTABLISHING THE SYMMETRICAL TEMPERATURE PROFILE AT THE EXIT FROM A BEND IN A FEEDER, AND FEEDER FOR IMPLEMENTING THE METHOD

(75) Inventors: Paula Goncalves Ferreira, Creteil (FR); Fabien Bouillet, Paris (FR)

(73) Assignee: Saint-Gobain Emballage, Courbevoie (FR)

( * ) Notice: Subject to any disclaimer, the term of this patent is extended or adjusted under 35 U.S.C. 154(b) by 312 days.

(21) Appl. No.: 13/576,558

(22) PCT Filed: Jan. 26, 2011

(86) PCT No.: PCT/FR2011/050153
§ 371 (c)(1),
(2), (4) Date: Sep. 12, 2012

(87) PCT Pub. No.: WO2011/095728
PCT Pub. Date: Aug. 11, 2011

(65) Prior Publication Data
US 2013/0031936 A1  Feb. 7, 2013

(30) Foreign Application Priority Data
Feb. 2, 2010 (FR) ..................... 10 50729

(51) Int. Cl.
*C03B 7/02* (2006.01)

(52) U.S. Cl.
CPC ....................... *C03B 7/02* (2013.01)
USPC .............. 65/134.1; 65/135.1; 65/333; 65/346

(58) Field of Classification Search
CPC ............. C03B 7/02; C03B 7/06; C03B 7/07; C03B 7/08; C03B 7/04; C03B 7/16; C03B 5/182; C03B 5/183; C03B 17/02; C03B 17/061; C03B 17/062; C03B 17/064; C03B 17/04; C03B 25/06; C03B 19/109; C03B 27/004; C03B 29/02; C03B 5/18; C03B 5/187; C03B 7/10
USPC ........ 65/135.1, 346, 121, 288, 324, 326, 347, 65/339, 340
See application file for complete search history.

(56) References Cited

U.S. PATENT DOCUMENTS

| | | | |
|---|---|---|---|
| 4,569,055 | A | 2/1986 | Williamson |
| 4,662,927 | A | 5/1987 | Blumenfeld |
| 4,803,698 | A | 2/1989 | Stephens |
| 5,862,169 | A | 1/1999 | Martlew et al. |

FOREIGN PATENT DOCUMENTS

| | | |
|---|---|---|
| EP | 0 512 900 | 11/1992 |
| WO | WO 2010015964 A3 * | 12/2010 |

OTHER PUBLICATIONS

International Search Report Issued May 24, 2011 in PCT/FR11/50153 Filed Jan. 26, 2011.

* cited by examiner

*Primary Examiner* — Jodi C Franklin
(74) *Attorney, Agent, or Firm* — Oblon, Spivak, McClelland, Maier & Neustadt, L.L.P.

(57) ABSTRACT

A method for re-establishing or tending to re-establish symmetrical distribution of temperatures between right-hand and left-hand sides of a cross section of a flow of molten glass that has been routed in a feeder including at least one bend area, thermal asymmetry having been induced by flowing round a bend. The feeder includes a flow channel, formed from refractory and insulative material elements and including a horizontal sole plate and two lateral walls, and a vault capping the channel, formed of a refractory roof and lateral parts including burners. In an area of each bend, the flow channel is modified by choosing a corresponding inclined sole plate portion, the inclination being chosen so that the flow channel is deeper in an outside region of the bend than in its inside region, heights of the two lateral walls of the channel being modified accordingly.

10 Claims, 3 Drawing Sheets

METHOD FOR RE-ESTABLISHING THE SYMMETRICAL TEMPERATURE PROFILE AT THE EXIT FROM A BEND IN A FEEDER, AND FEEDER FOR IMPLEMENTING THE METHOD

The present invention relates to a method for re-establishing symmetry of the distribution of temperatures between the right-hand and left-hand sides of the cross section of a flow of molten glass that has been routed in a feeder and the flow of which has been rendered asymmetrical by passing through a bend area, which has induced thermal asymmetry.

Molten glass transfer devices, known as feeders, are designed to route the molten glass from the glass production area (melting furnace) to a forming area (forming or molding machine). A feeder comprises a refractory material lower part forming a channel for the flow of glass, thermally insulated by various insulative materials, and an upper part also thermally insulated and forming a vault capping the channel.

A feeder may consist in a simple line directly connecting the melting furnace to the forming machine.

However, a feeder may also include at least one bend area that enables its shape to be adapted to the spatial constraints of the line.

The present invention concerns feeders including at least one bend area.

The mean temperature and the thermal homogeneity of the glass at the exit from the feeder are crucial for forming, in particular for the formation of parisons with the thermal characteristics required by the fabrication method. The two thermal criteria at the feeder exit are:

- to have as symmetrical as possible a distribution of temperatures between the right-hand and left-hand sides of the feeder across the cross section of the channel at the exit;
- to reduce as far as possible as a function of the color of the glass temperature gradients between the coldest areas and the hottest areas of the glass in that same section.

Compliance with these set points assists with the formation of the left-hand and right-hand parisons of a double-parison machine, with similar thermal characteristics and weak and axially symmetrical temperature gradients between the core and the skin of the parison.

A bend area in a feeder is a source of thermal asymmetry because the flow of the glass in this area is characterized by an asymmetric speed field, with differential head losses and thermal losses between the inside and the outside of the bend.

Consequently, if the glass has at the entry of the bend a symmetrical temperature profile with a hot central vein, that hot vein of glass is no longer centered in the middle of the cross section of the channel at the exit from the bend and the cold areas near the base plate and the vertical walls of the feeder are generally at lower temperatures on the outside of the bend than on the inside. Although, for lighter colored glasses, the lack of thermal homogeneity created in this way has time to be absorbed and to disappear between the area of the bend and the exit area of the feeder, for glasses of darker color, characterized by a thermal set-up length of the order of several meters, this is no longer the case.

Lack of temperature homogeneity in the circumference of the parison (glass droplet) may lead to thickness heterogeneities in the circumference of the articles formed (bottles, pots, etc.).

The present invention aims to remedy these drawbacks that stem from the fact that the hot vein of a flow of glass in a feeder is diverted at the exit from the bend, such diversion accentuating the temperature heterogeneity.

The first object of the present invention is therefore a method for re-establishing a symmetrical distribution of temperatures between the right-hand and left-hand sides of the cross section of a flow of molten glass that has been routed in a feeder including at least one bend area, thermal asymmetry having been induced by flowing round a bend, the feeder comprising:

a flow channel formed from refractory and insulative material elements and constituted of a horizontal sole plate and two lateral walls; and a vault formed of a refractory roof and lateral parts equipped with burners, characterized in that, in the area of the or each bend, the flow channel is modified by choosing a corresponding inclined sole plate portion, the inclination being chosen so that the flow channel is deeper in the outside region of the bend than in its inside region, the heights of the two lateral walls of the channel being modified accordingly.

A sole plate inclination of 2° to 12° relative to the horizontal may be chosen in the area of the bend or of each bend.

A sole plate inclination of 9° to 10° relative to the horizontal may in particular be chosen in the area of the bend or of each bend.

A sole plate inclination is advantageously chosen that decreases progressively from the area of the bend to the horizontal, on the one hand, in an entry area of the bend that constitutes an area of connection with the channel in the entry branch of the feeder and, on the other hand, in an exit area of the bend constituting an area of connection with the channel in the exit branch of the feeder.

According to the present invention the flow channel may be modified in a bend area for which the entry branch and the exit branch form an angle greater than or equal to 80° and less than 180°, in particular an angle of 90°.

The present invention also provides a device for transferring molten glass from the area of production of the glass to the forming or molding area, constituted by a feeder including at least one bend area, the feeder comprising:

a flow channel formed from refractory and insulative material elements and constituted of a horizontal sole plate and two lateral walls; and a vault capping the channel, formed of a refractory roof and lateral parts equipped with burners, characterized in that, in the region of a bend, the sole plate is modified to have an inclination relative to the horizontal such that the flow channel is deeper in the outside region of the bend than in the inside region.

The sole plate inclination in the area of the bend or of each bend may be chosen as indicated above.

According to one particular embodiment the sole plate inclination decreases progressively from the area of the bend to the horizontal, on the one hand, in an entry area of the bend which constitutes an area of connection with the channel in the entry branch of the feeder and, on the other hand, in an exit area of the bend constituting an area of connection with the channel in the exit branch of the feeder.

According to the invention the flow channel is modified in a bend area for which the entry branch and the exit branch form an angle greater than or equal to 80° and less than 180°, in particular an angle of 90°.

To better illustrate the object of the present invention, one particular embodiment thereof will be described hereinafter by way of nonlimiting illustration and with reference to the appended drawing.

Figure 4:
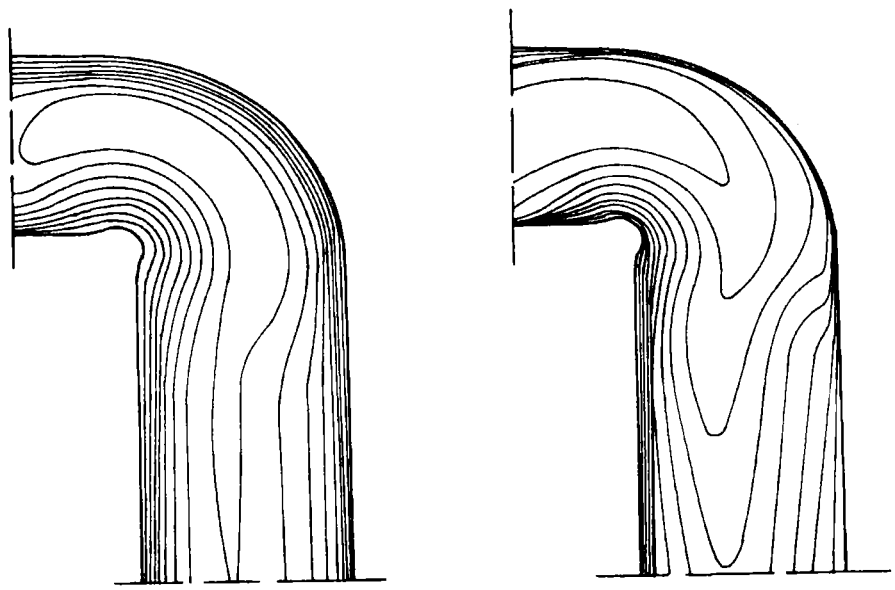
Figure 5:
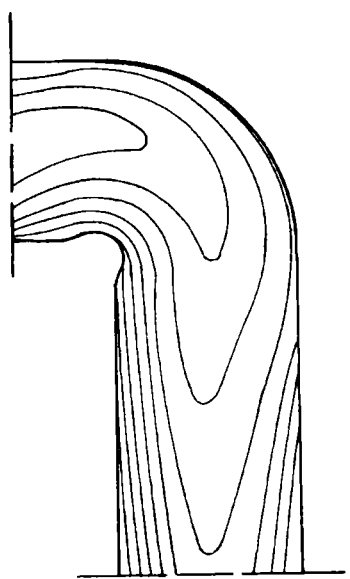

FIG. 4 shows curves of speed (on the left) and temperature (on the right) in a horizontal plane at the mid-height of the glass for the inclined sole plate geometry and a hot vein at the entry, in the case of a dark-colored glass; and FIG. 5 shows temperature level curves in a horizontal plane at the mid-height of the glass for the geometry of the invention with inclined sole plate and a hot vein in the case of a glass of lighter color.

Figure 1:
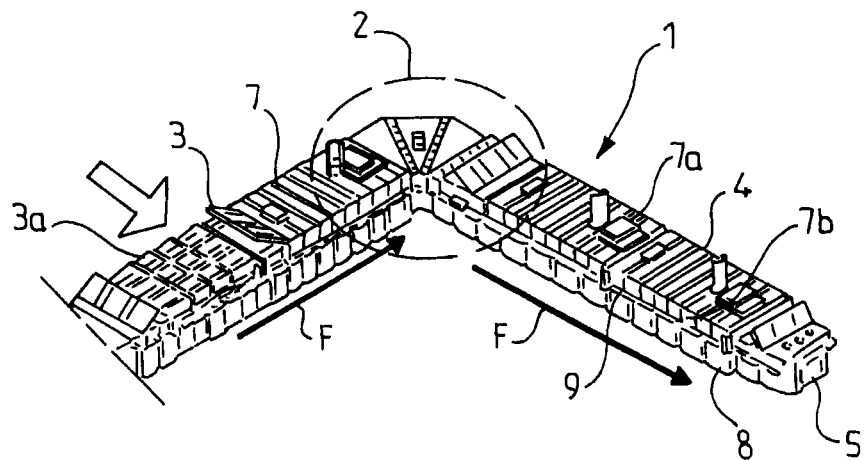
FIG. 1 is a diagrammatic perspective view of a bend area of a feeder of the invention.

Referring to FIG. 1, there is diagrammatically represented part of a feeder 1 including an area with a bend 2 which provides a transition between a first branch 3 and a second branch 4 of the feeder, the branches 3 and 4 being at an angle of 90°.

The branch 3 is fed transversely via its outside edge 3a by the flow of glass leaving the melting furnace used to produce the glass. The branch 4 has at its free end a device 5 for feeding a forming machine.

The path of the glass in the feeder is represented by the arrows F.

The structure of the feeder is known and will not be described in more detail here. There may be seen in FIG. 1 the vault 7 of the feeder 1, formed of a flat roof 7a and lateral parts 7b equipped with burners at the location 9. The vault 7 caps the channel 8 (FIG. 2) of the feeder 1.

The burners 9 rest on the horizontal upper wall of the walls 8b, 8c of the channel 8.

Figure 2:
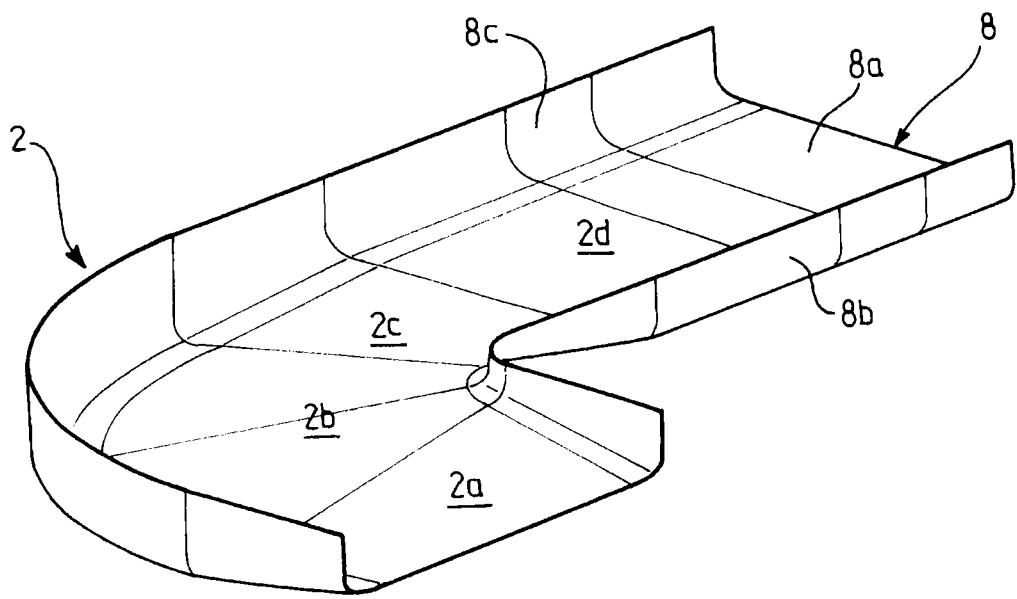
FIG. 2 is a perspective view to a larger scale of the sole plate of the molten glass flow channel in a bend portion.

The portion of the channel 8 in the bend area 2 is represented to a larger scale in FIG. 2. The channel includes a sole plate 8a and lateral walls 8b, 8c generally perpendicular to the sole plate 8a.

In a classic feeder channel 8, the sole plate 8a is horizontal and the lateral walls 8b, 8c are the same height.

According to the present invention, the sole plate 8a has been modified to feature a downwardly inclined outside portion in the bend area 2.

In the example shown, starting with a channel 8 having a sole plate 8a 1300 mm wide and lateral walls 8b, 8c 200 mm high, the geometry of the channel 8 was modified as follows: the bend area 2 of the channel 8 was divided along the flow path F of the glass into:
 a bend entry area 2a constituting an area of connection with the channel 8 in the entry branch 3 of the feeder 1;
 a bend area 2b;
 a bend exit area 2c, constituting an area of connection with the channel 8 in the exit branch 4 of the feeder 1.

In FIG. 2 there has been represented the area 2d of the channel 8 following on from the bend exit area 2c and constituting a standard part of the channel 8 as analyses of the evolution of the flow of glass are carried out in this area 2d have shown.

The dimensions of the areas 2a to 2d are as follows:
 length of areas 2a and 2c: 610 mm;
 height of inside wall 8b in area 2b: 102 mm at an angle of 90°;
 height of outside wall 8c in area 2b: 302 mm at an angle of 90°; and
 length of flow analysis area 2d: 1600 mm.

The height of the outside walls 8c in the areas 2a and 2c decreases progressively in the direction of the standard areas disposed at the entry and the exit of the bend.

The downward and outward inclination of the sole plate of the invention relative to the horizontal is approximately 10° in the bend region 2b. This inclination decreases progressively in the areas 2a and 2c in the direction of the standard bend entry and exit areas.

Figure 3:
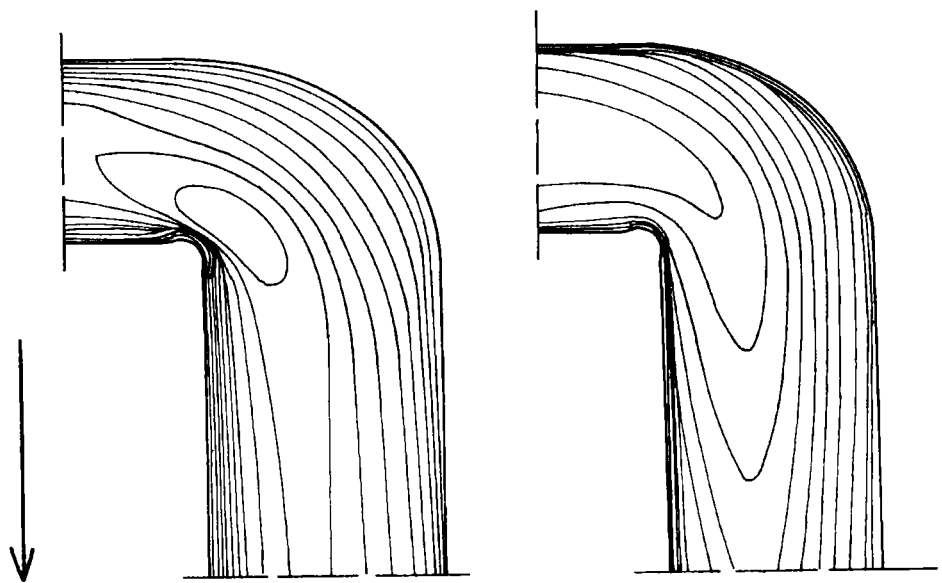
FIG. 3 shows curves of speed (on the left) and temperature (on the right) in a horizontal plane at the mid-height of the glass for the flat sole plate geometry and a hot vein at the entry, in the case of a dark-colored glass.

FIGS. 3 and 4 compare the speed level curves (on the left in these two figures) and the temperature level curves (on the right in these two figures) obtained with a flat sole plate geometry (FIG. 3) and an inclined sole plate geometry (FIG. 4), these geometries being as described above. The speed and temperature level curves represented in FIGS. 3 and 4 (as well as in FIG. 5 described hereinafter) correspond to the flow at the mid-height in a bend with flat and inclined sole plates, respectively (as represented in FIGS. 2).

The entry temperature profile is a so-called hot vein profile and corresponds to a flow rate of 100 t/d.

In the left-hand part of FIG. 3, it can be seen that the speed level curve of the glass at the mid-height shows the diversion of the flow toward the inside of the bend, with higher speeds in that region. The asymmetry is maintained as far as the exit of the channel. Lower speeds may be observed at the outside edge of the bend.

The temperature level curve in the right-hand part of FIG. 3 shows strong cooling of the glass on the outside of the bend, where the area of contact with the walls is greater. The colder glass has a higher viscosity, which accentuates the initial reduction of speeds. The temperature level curve retains this asymmetry with higher temperatures on the inside wall as far as the exit of the passage.

In the case of the inclined sole plate, the speed level curves (left-hand part of FIG. 4) and temperature level curves (right-hand part of FIG. 4) show the diversion of the flow toward the outside of the bend with a hot area recentered at the exit from the bend.

The inclination of the sole plate enables the hot vein to be rendered symmetrical again within the width of the feeder. The apparent modification of the internal profile of the bend in FIG. 4 is caused by the fact that the section is situated in the inclined plane of the sole plate at this location.

Referring to FIG. 5, it can be seen that the temperature level curve has been represented in the same way as in FIG. 4, no longer for a dark-colored glass but for a light-colored glass. The temperature profile at the entry is the same as for the dark-colored glass. The curve for the temperature level in the horizontal plane at the mid-height of the glass shows the diversion of the flow toward the outside of the bend. The inclination of the sole plate also enables the hot vein to be rendered symmetrical again toward the outside of the bend.

The invention claimed is:

1. A method for re-establishing or tending to re-establish a symmetrical distribution of temperatures between right-hand and left-hand sides of a cross section of a flow of molten glass that has been routed in a feeder including at least one bend area, thermal asymmetry having been induced by flowing round said bend area, the feeder including: a flow channel formed from refractory and insulative material elements and including a horizontal sole plate and two lateral walls; and a vault capping the channel, formed of a refractory roof and lateral parts including burners; and each said bend area having an inside region and an outside region where a radius of curvature of the inside region is smaller than a radius of curvature of said outside region;
 the method comprising: in an area of each bend area, modifying the flow channel by choosing a corresponding inclined sole plate portion having an inclination being at least 2° relative to the horizontal and chosen so that the flow channel is deeper in said outside region of the bend area than in said inside region and modifying a lateral wall of said outside region such that it is a longer length than a lateral wall of the inside region.

2. The method as claimed in claim 1, wherein the sole plate portion inclination of up to 12° relative to the horizontal is chosen in the area of each bend area.

3. The method as claimed in claim 2, wherein the sole plate portion inclination of 9° to 10° relative to the horizontal is chosen in the area of each bend area.

4. The method as claimed in claim 1, wherein the sole plate portion inclination is chosen that decreases progressively from the area of each bend area to the horizontal, in an entry area of each bend area that constitutes an area of connection with the channel in an entry branch of the feeder, and in an exit area of each bend area constituting an area of connection with the channel in an exit branch of the feeder.

5. The method as claimed in claim 1, wherein the flow channel is modified in each bend area for which an entry branch and an exit branch form an angle greater than or equal to 80° and less than 180°, or is an angle of 90°.

6. A device for transferring molten glass from an area of production of the glass to a forming or molding area, comprising:
    a feeder including at least one bend area, the feeder comprising:
        a flow channel formed from refractory and insulative material elements and including a horizontal sole plate and two lateral walls; and
        a vault capping the channel, formed of a refractory roof and lateral parts including burners,
    wherein, in a region of each bend, the sole plate is modified to have an inclination at least 2° relative to the horizontal such that the flow channel is deeper in an outside region of the bend than in an inside region.

7. The device as claimed in claim 6, wherein the sole plate inclination is chosen in the area of each bend of up to 12° relative to the horizontal.

8. The device as claimed in claim 7, wherein the sole plate inclination is chosen in the area of each bend of 9° to 10° relative to the horizontal.

9. The device as claimed in claim 6, wherein the inclination of the sole plate is chosen that decreases progressively from the area of each bend to the horizontal, in an entry area of each bend which constitutes an area of connection with the channel in an entry branch of the feeder, and in an exit area of each bend constituting an area of connection with the channel in an exit branch of the feeder.

10. The device as claimed in claim 6, wherein the flow channel is modified in each bend area for which an entry branch and an exit branch form an angle greater than or equal to 80° and less than 180°, or an angle of 90°.

* * * * *